United States Patent

[11] 3,611,189

| [72] | Inventors | James H. Stone<br>Malden;<br>John C. Carmody, Wakefield; Donald R. Gorsuch, Chelmsford, Mass.; Victor A. Misek, Hudson, N.H. |
|---|---|---|
| [21] | Appl. No. | 864,317 |
| [22] | Filed | Oct. 7, 1969 |
| [45] | Patented | Oct. 5, 1971 |
| [73] | Assignee | Sanders Associates Inc.<br>South Nashua, N.H. |

[54] DIFFUSE SOLID STATE LASER CAVITY
9 Claims, 1 Drawing Fig.
[52] U.S. Cl. .................................................. 331/94.5
[51] Int. Cl. ..................................................... H01s 3/02, H01s 3/09
[50] Field of Search .......................................... 331/94.5

[56] References Cited
UNITED STATES PATENTS
| 3,387,227 | 6/1968 | Mastrup et al................ | 331/94.5 |
| 3,428,860 | 2/1969 | Mastrup....................... | 315/111 |

*Primary Examiner*—Ronald L. Wibert
*Assistant Examiner*—R. J. Webster
*Attorney*—Louis Etlinger

ABSTRACT: A diffuse solid state laser cavity comprises an outer dielectri cylinder and a transparent inner cylinder concentrically disposed within the first. A liquid coolant is circulated through the inner cylinder and the annular between the inner and outer cylinders is filled with a diffuse refecting material. Electrically conductive end cap assemblies having means for mounting a laser crystal and flashlamp are disposed on each end of the concentric cylinders. There is a provision in one end cap for threading in the flashlamp to assure electrical contact and facilitate lamp replacement.

PATENTED OCT 5 1971
3,611,189
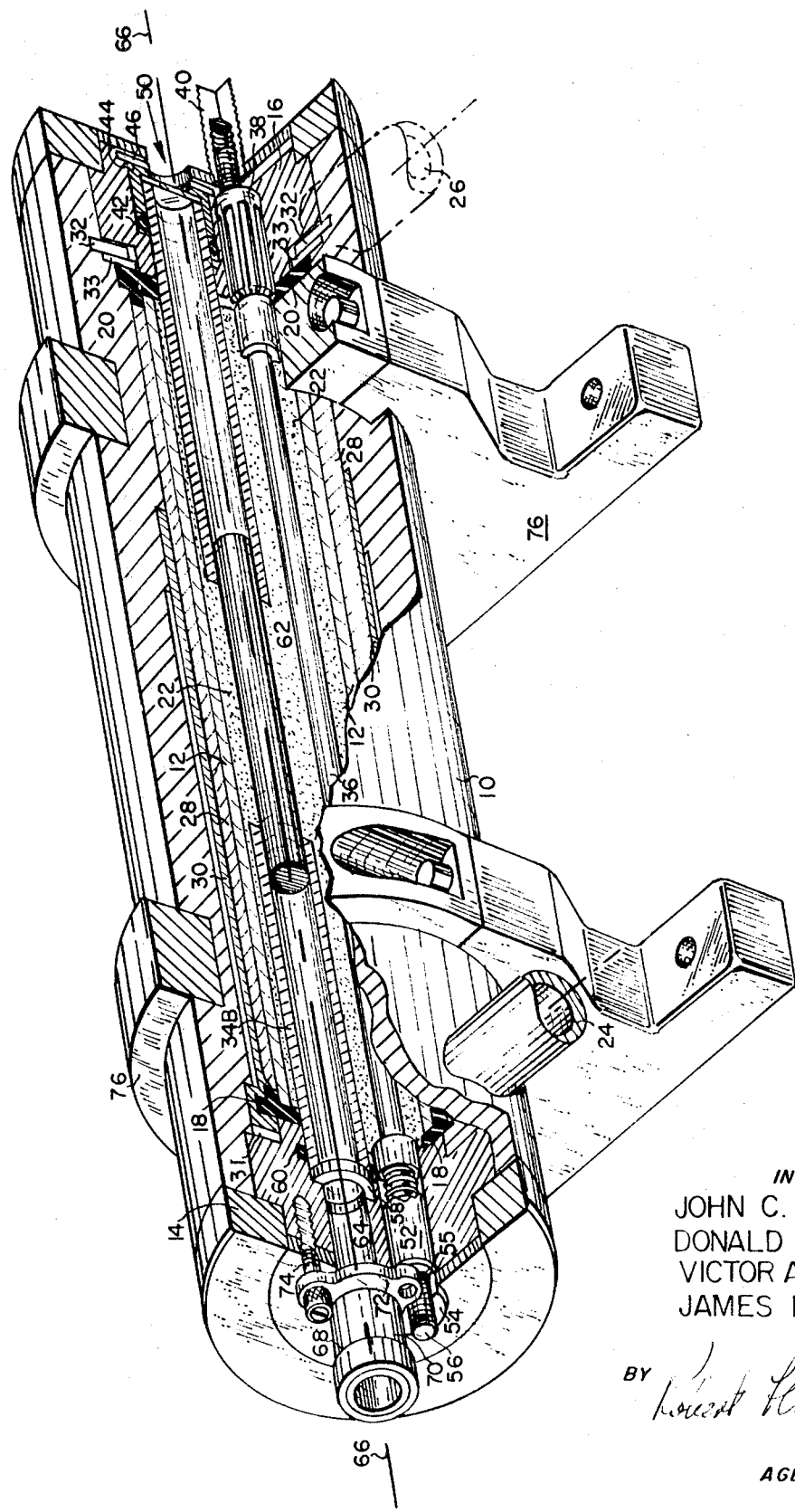
INVENTORS
JOHN C. CARMODY
DONALD R. GORSUCH
VICTOR A. MISEK
JAMES H. STONE
BY *Robert Rea Epps*
AGENT

DIFFUSE SOLID STATE LASER CAVITY

BACKGROUND OF THE INVENTION

The invention herein described was made under a contract with the Department of the Army.

FIELD OF THE INVENTION

The present invention relates most generally to the field of electro-optics and more particularly to a new and novel solid-state laser cavity.

DESCRIPTION OF THE PRIOR ART

Prior to the present invention solid-state diffuse laser cavities using linear flashlamps were fabricated with quick-disconnect socket-type flashlamp holders and involved the use of individual coolant jackets disposed about the laser crystal and flashlamp and separate voltage leads for flashlamp ionization and main energy storage banks. A number of disadvantages attend the use of apparatus constructed in accordance with the prior art. The disadvantage in having the flashlamp mounted in the typical spring-type socket holders is the difficulty involved in flashlamp replacement. The commonly accepted technique is to use an extension from one of the lamp holders as a handle or tool for removing the flashlamp from the cavity by way of the end cap. Since there is no positive or rigid contact between the holder and flashlamp the holder is free to slip leaving the flashlamp within the cavity. In the prior art liquid-cooled cavities having individual cooling jackets over the crystal and flashlamp, disadvantages arise in increased fabrication costs as a consequence of the additional parts and the relatively large number of coolant seal interfaces, a decrease in the reliability due to increased chances of leakage through seal interfaces and jacket breakage as well as an undue parts inventory which must be maintained. To insure ionization of the flashlamp the prior art laser cavities involved bringing a high-voltage lead through either an end cap or the cavity wall to a trigger wire placed adjacent to and in contact with the flashlamp. This approach requires the high-voltage line to be electrically insulated from the main energy bank discharge lead and the cavity wall. For reliable flashlamp ionization the trigger wire must be maintained precisely in its design position with respect to the flashlamp and replacement of the flashlamp is further complicated. An additional problem which has been apparent in the prior art laser cavities is their susceptibility to cavity damage and laser crystal misalignment due to moderate shock and vibration.

OBJECTS AND SUMMARY OF THE INVENTION

It is therefore a primary object of the present invention to provide a new and novel solid-state laser cavity of simplified construction.

It is another object of the present invention to provide apparatus of the above-described character having improved reliability.

It is also an object of the present invention to provide apparatus of the above-described character wherein flashlamp replacement is facilitated. It is an additional object of the present invention to provide apparatus of the above-described character wherein both a laser crystal and flashlamp are disposed within a single coolant jacket.

It is a further object of the present invention to provide apparatus of the above-described character which eliminates a requirement for a flashlamp trigger wire and improves flashlamp firing.

It is yet another object of the present invention to provide apparatus of the above-described character having reduced susceptibility to vibration and shock damage.

It is still a further object of the present invention to provide apparatus of the above-described character wherein flashlamp replacement is not disruptive of crystal alignment.

The foregoing as well as other objectives of the present invention are achieved by providing two concentric hollow cylinders the outer one of which is formed of a dielectric material and the inner cylinder of quartz or pyrex. The annulus between the cylinders is filled with a diffuse reflecting material and the cylinder ends are sealed with rubber or silicone gaskets contained within the electrically conductive end cap assemblies. Means are provided in the end cap assemblies for mounting both a laser crystal and flashlamp within the inner cylinder through which a suitable liquid coolant is circulated.

These and other objects, features and advantages of the present invention will become more apparent from the detailed discussion considered in conjunction with the appended drawing.

BRIEF DESCRIPTION OF THE DRAWING

The appended FIGURE is a schematic three dimensional view with portions cut away of a laser cavity in accordance with the principles of the present invention.

DESCRIPTION OF PREFERRED EMBODIMENT

Referring now to the appended drawing there is illustrated a laser cavity in accordance with the principles of the present invention. Essentially the cavity comprises an outer cylindrical housing 10 of a dielectric material and a quartz or Pyrex cylinder 12 concentrically disposed within the dielectric cylinder 10. Both cylinders 10 and 12 are capped or closed off at each end by electrically conductive end cap assemblies 14 and 16. The inner quartz cylinder 12 is shock mounted to the end cap assemblies 14 and 16 by rubber seals 18 and 20 respectively to thereby define a fluidtight cooling chamber 22. Waste heat generated within the laser cavity is removed by circulating a suitable liquid coolant through the inner cylinder 12 by means of inlet and outlet ports 24 and 26 respectively, (the latter being illustrated in phantom) which communicate with the chamber 22 and are coupled to a coolant supply and circulating pump (not shown).

The annulus formed between the inner and outer cylinders 12 and 10 is filled with a diffuse reflecting material 28 such as magnesium oxide and is sealed by seals 18 and 20 which may be formed of rubber, silicone or other environmentally compatible material. An electrically conductive sleeve 30 in electrical contact with the end cap assembly via spring 31 and which is part of the outer cylinder assembly 14 holds the seal 18 in place while retaining ring 32 and washer 33 hold seal 20 in place. The outer dielectric cylinder 10, quartz tube 12, seals 18 and 20, sleeve 30, retaining ring 32 and reflecting material 28 in combination form an independent and replaceable subassembly of the present invention. The end cap assemblies 14 and 16 serve to compress, the seals 18 and 20 against the quartz cooling jacket 12 thereby providing an environmentally tight interface.

Provision is made in each end cap assembly for mounting a laser rod holder 34 and a flashlamp 36. The right end cap assembly 16 is provided with a serrated lamp socket 38 which extends through the end cap, terminating in a threaded electrical connecting lug 40. The right half 34A of the laser rod holder is supported in the end cap assembly 16 by an "O" ring 42 which forms a liquidtight interface between the rod holder 34A and the end cap 16. The "O" ring 42 is held in position by a retainer 44 which is in turn locked in position by a snapring 46. The "O" ring retainer 44 also serves to hold an output window 48 in position between the rod holder 34A and an output aperture 50 in the end cap assembly 16. The left end cap assembly 14 is provided with a threaded lamp holder 52 into which the flashlamp 36 is screwed. The lamp holder 52 is secured in position by a lock nut 54 such that it extends through the end cap assembly terminating in a threaded electrical connecting lug 56 and a liquidtight seal is provided by "O" ring 55. The left half 34B of the laser rod holder is held in position against a crystal shim 58 in the left end cap assembly 14 by an "O" ring 60. A laser rod 62 is press fit into each rod holder 34A and 34B such that the rod, rod holders and end cap apertures 50 and 64 are in alignment along the optical axis 66 of the cavity. The "O" rings 42, 60 and 55 provide interface seals which prevent liquid leakage from the cooling chamber 22.

A mirror holder assembly 68 comprising an optical tube 70 and adjustable plate 72 is mounted on the left end cap 14 by three spring loaded adjustment screws 74 (only one of which is shown). A suitable mirror (not shown) is mounted in the tube 70 thus defining one end of the resonant cavity. A Q-switch (not shown) of any suitable type may be disposed along the optical axis 66 external to the right end of the cavity and defines the other end of the resonant cavity.

The entire assembly described above may be placed in any suitable mounting means 76 appropriate for the application in which the present invention is used.

In operation a high-voltage flashlamp power supply (not shown) is connected across the lamp holder connecting lugs 40 and 56. The electrically conductive sleeve 30 placed around the outside of the diffuse reflecting medium 28 is in electrical contact with the high-trigger voltage and extends as far along the cavity as possible, the limiting factor being the distance required to prevent arc over to the opposite terminal. Thus when the high voltage is applied to the flashlamp 36, an electric field is created which enables the flashlamp to be reliably ionized.

The laser cavity constructed according to the principles of the present invention provides an easily maintainable device. Replacement of the diffuse reflecting medium is facilitated as is flashlamp replacement which may be accomplished without disrupting the precision alignment of the resonant cavity. It will thus be seen that the Applicants have provided a new and novel laser cavity which is significantly improved as to its maintainability, reliability and flexibility compared to the prior art. It will be apparent that the objectives set forth hereinabove are efficiently met and since certain changes may be made in the above construction without departing from the scope of the invention all matter contained in the foregoing description or shown in the appended figure is intended to be illustrative and is not to be interpreted as limiting.

Having described what is new and novel and desired to secure by Letters Patent, what is claimed is:

1. A solid-state laser pump cavity comprising
   an outer, hollow, cylindrical housing formed of a dielectric material;
   an inner, hollow, optically transparent cylinder having an outside diameter which is less than the inside diameter of said housing and disposed concentrically within said housing,
   electrically conductive end cap assemblies disposed at each end of and in contact with said housing and cylinder;
   an electrically conductive sleeve disposed on the inside surface of said housing, in electrical contact with one said end cap assembly and separated from the other said end cap assembly by a distance in excess of a preselected voltage arc-over distance;
   a diffusely reflecting medium substantially filling the space between said housing and said inner cylinder;
   each said end cap assembly including means for mounting a solid-state laser rod longitudinally within said inner cylinder, an aperture in axial alignment with said rod-mounting means, electrically conductive means for mounting a flashlamp within said inner cylinder substantially parallel to said laser rod, and means for coupling a voltage source across said cavity to selectively actuate said flashlamp.

2. Apparatus as recited in claim 1 further including
   means for circulating a fluid coolant through said inner cylinder including input and output ports disposed through said housing and in communication with the interior of said inner cylinder.

3. Apparatus as recited in claim 1 wherein said diffusely reflecting medium is magnesium oxide.

4. Apparatus as recited in claim 1 wherein said flashlamp-mounting means comprises
   an electrically conductive serrated socket extending through and electrically continuous with one said end cap assembly, and
   a removable electrically conductive threaded socket extending through and electrically continuous with the other said end cap assembly
   whereby said flashlamp may be inserted and withdrawn from said inner cylinder without disrupting said laser-rod-mounting alignment.

5. Apparatus as recited in claim 1 wherein
   said laser-rod-mounting means comprises first and second hollow cylindrical rod holders each adapted at one end to accommodate said laser rod and at the opposite end for mounting in said end cap assemblies.

6. Apparatus as recited in claim 5 further including
   means for shock mounting said cylindrical rod holders in said end cap assemblies.

7. Apparatus as recited in claim 2 further including
   means for shock mounting said inner cylinder within said housing and for providing a fluidtight seal between said inner cylinder and said end cap assemblies.

8. Apparatus as recited in claim 1 further including
   means for adjustably mounting an optical cavity defining mirror on one said end cap assembly in axial alignment with said aperture therein, and
   means for mounting a Q-switch assembly on the other said end cap assembly in axial alignment with said aperture therein to thereby define the opposite end of said optical cavity.

9. Apparatus as recited in claim 4 further including
   means for shock mounting said serrated socket and said threaded socket in said end cap assemblies.